United States Patent [19]

Stubblefield

[11] E Patent Number: Re. 33,066

[45] Reissued Date of Patent: Sep. 26, 1989

[54] SHOE SOLE CONSTRUCTION

[75] Inventor: Jerry D. Stubblefield, Portland, Oreg.

[73] Assignee: AVIA Group International, Inc., Portland, Oreg.

[21] Appl. No.: 899,058

[22] Filed: Aug. 22, 1986

Related U.S. Patent Documents

Reissue of:

[64] Patent No.: 4,817,278
Issued: Nov. 13, 1984
Appl. No.: 390,380
Filed: Jun. 21, 1982

U.S. Applications:

[62] Division of Ser. No. 147,140, May 6, 1980, Pat. No. 4,335,530.

[51] Int. Cl.[4] ..... A43B 13/12

[52] U.S. Cl. ..... 36/83; 36/30 R

[58] Field of Search ..... 36/102, 103, 28, 30 R, 36/31, 37, 83, 32 R, 59 A

[56] References Cited

U.S. PATENT DOCUMENTS

| | | | |
|---|---|---|---|
| 416,816 | 12/1889 | Scafe | 36/28 |
| 416,861 | 12/1889 | Scafe | 36/28 |
| 1,206,597 | 12/1916 | Russell | 36/28 |
| 2,199,853 | 5/1940 | Joyce | 36/30 R |
| 2,201,300 | 5/1940 | Prue | 12/142 |
| 2,327,360 | 8/1943 | Margolin | 36/3 R |
| 2,350,362 | 6/1944 | Margolin | 36/3 R |
| 2,745,197 | 5/1956 | Holt | 36/102 |
| 2,826,832 | 3/1958 | Rollman et al. | 36/28 |
| 2,844,833 | 7/1958 | Odermatt | 12/146 |
| 2,931,110 | 4/1960 | Pietrocola | 36/30 |
| 4,043,058 | 8/1977 | Hollister et al. | 30/102 |
| 4,124,946 | 11/1978 | Tomlin | 36/43 |
| 4,335,530 | 6/1982 | Stubblefield | 36/30 R |
| 4,372,058 | 2/1983 | Stubblefield | 36/31 |
| 4,481,727 | 11/1984 | Stubblefield | 36/30 R |

FOREIGN PATENT DOCUMENTS

| | | | |
|---|---|---|---|
| 680698 | 9/1939 | Fed. Rep. of Germany . | |
| 545716 | 10/1922 | France . | |
| 2269881 | 3/1974 | France . | |
| 331308 | 10/1935 | Italy . | |
| 34-9012 | 6/1959 | Japan . | |
| 56-63302 | 5/1981 | Japan . | |
| WO83/04166 | 12/1983 | PCT Int'l Appl. | 36/103 |
| 328731 | 3/1958 | Switzerland | 36/32 R |
| 17478 | of 1889 | United Kingdom | 36/31 |
| 19548 | of 1891 | United Kingdom . | |
| 115041 | 12/1918 | United Kingdom | 36/31 |
| 216466 | 5/1924 | United Kingdom | 36/59 A |

*Primary Examiner*—Steven N. Meyers
*Attorney, Agent, or Firm*—Saidman, Sterne, Kessler & Goldstein

[57] ABSTRACT

A shoe sole construction which features an outer sole (18) having at least one opening (26) through which a protrusion (30) of a less dense midsole (16) extends. The cutout area (26) of the more dense outsole (18) decreases the overall weight of the sole (12), while the less dense protrusion (30) aids in cushioning the foot to provide greater comfort and support. Other protrusions (32 and 68) may also be provided through other openings in the outsole to further lessen weight and increase the cushioning effect on the foot. Additionally, grooves (42) may be provided on the upper surface (40) of the midsole (16) to increase flexibility of the sole (12) and further aid in cushioning the foot and providing peripheral support where needed. The invention may be applied to athletic shoes (FIGS. 1–9), a woman's high-heeled shoe (FIGS. 10–14), or other footwear.

52 Claims, 3 Drawing Sheets

FIG. 1
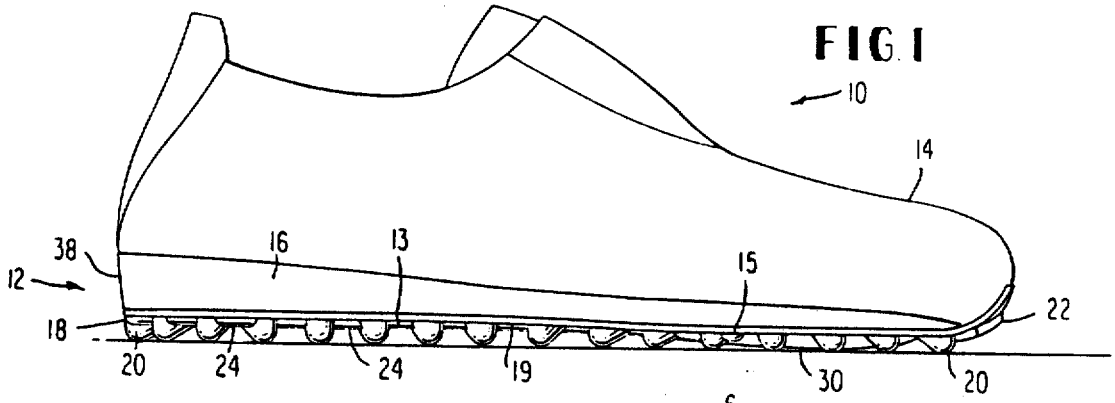
FIG. 2
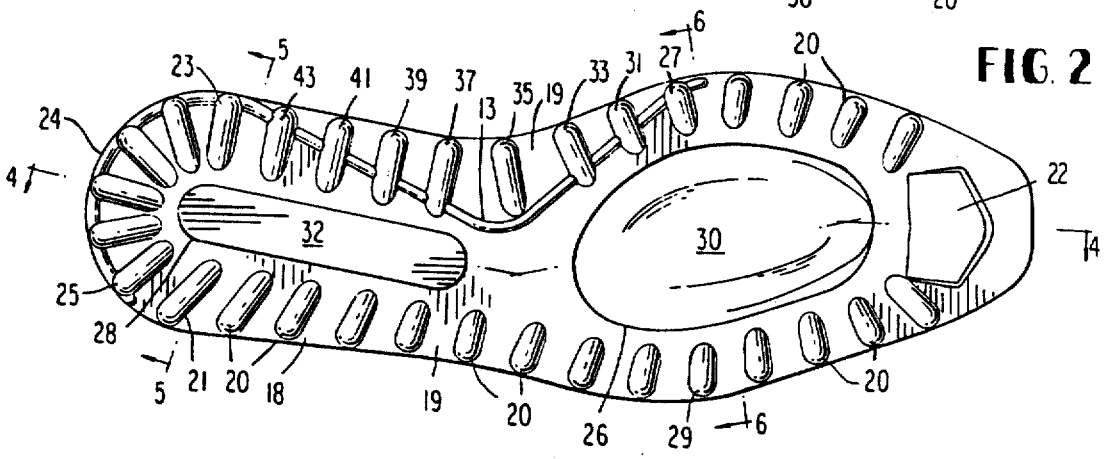
FIG. 3
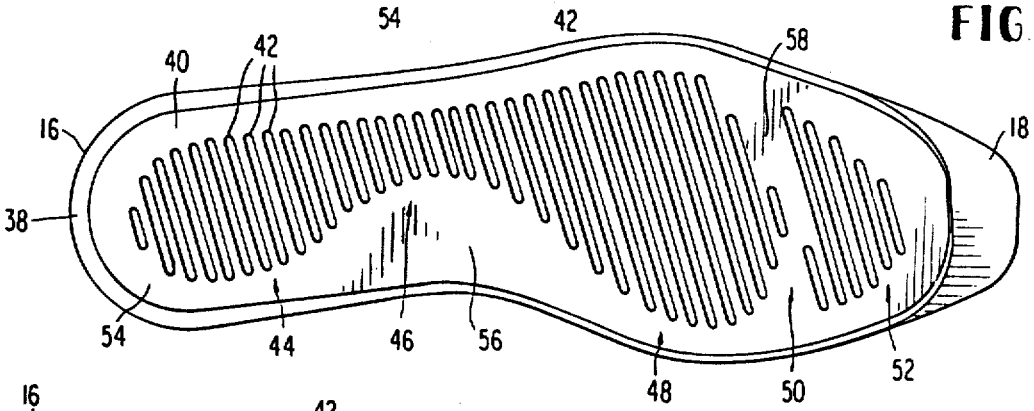
FIG. 4
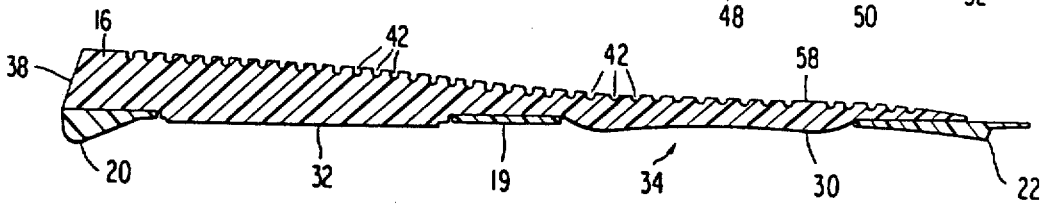
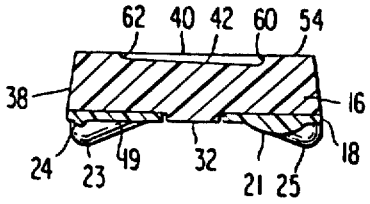
FIG. 5
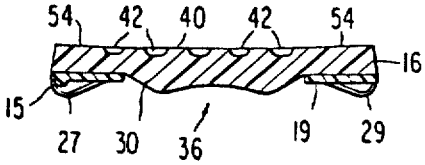
FIG. 6

FIG. 7
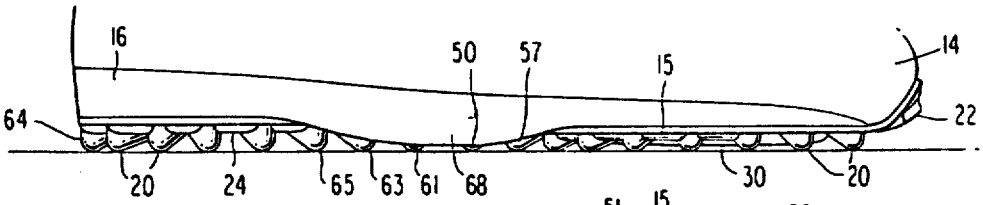
FIG. 8
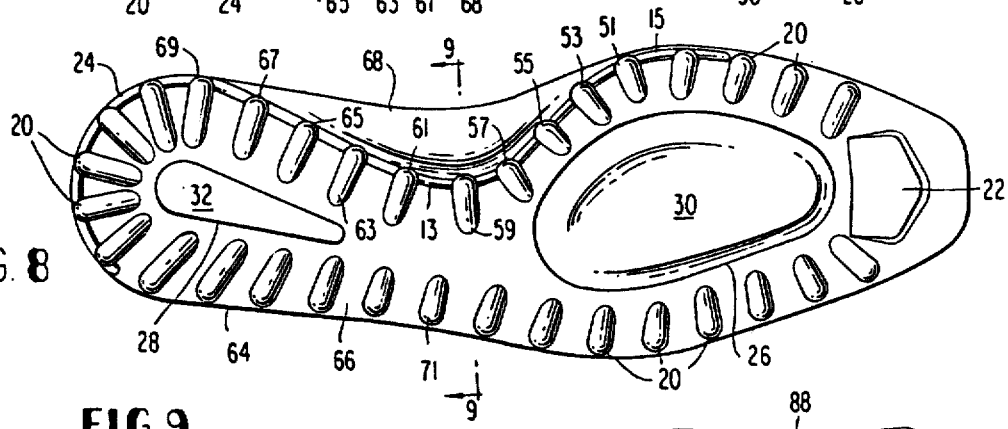
FIG. 9
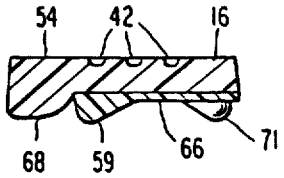
FIG. 14
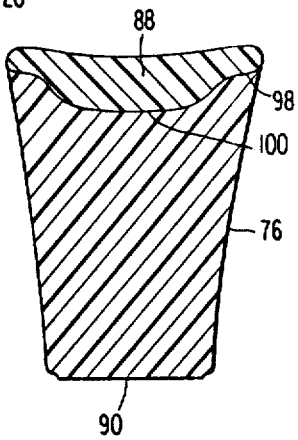
FIG. 12
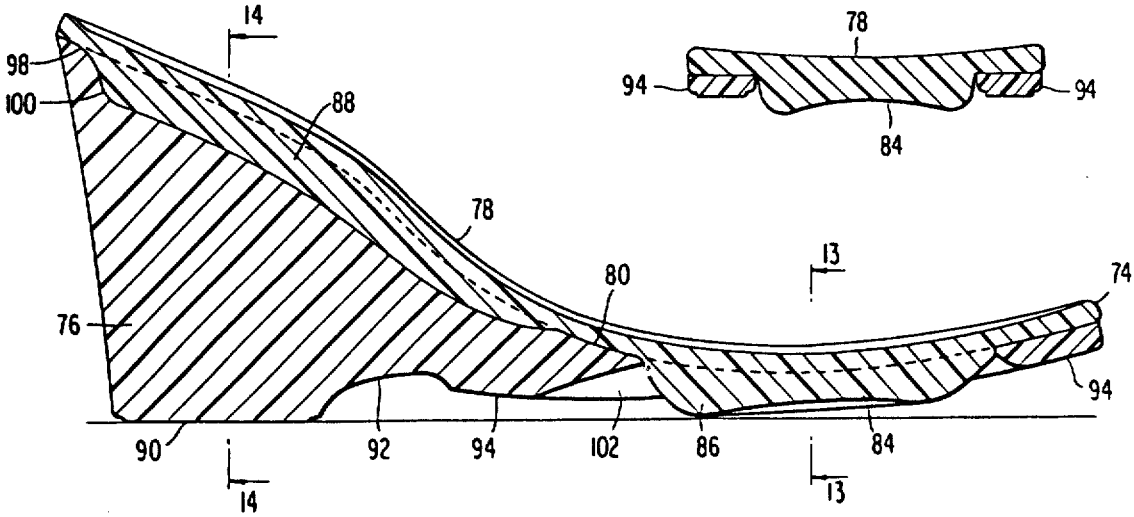
FIG. 13

SHOE SOLE CONSTRUCTION

Matter enclosed in heavy brackets [ ] appears in the original patent but forms no part of this reissue specification; matter printed in italics indicates the additions made by reissue.

This application is a division of application Ser. No. 147,140 filed May 6, 1980, now U.S. Pat. No. 4,335,530.

BACKGROUND OF THE INVENTION

1. Field of the Invention

The present invention is related to shoes and, more particularly, is directed towards a new and improved shoe sole construction which features novel midsole and outsole structure.

2. Description of the Prior Art

Many shoe sole constructions have been advanced which attempt to provide maximum comfort and stability for the foot. Other constructions aim at achieving maximum flexibility of the sole. Still other shoe sole constructions, rotably in the field of running shoes, attempt to provide as lightweight a shoe as possible while achieving maximum foot stability, shock absorption, and outsole wear. Recently, greater attention has been paid, particularly in the running shoe field, towards providing greater shock absorption to minimize the introduction of impact-induced shock components back into the shoe, foot and leg of the runner. Exemplary of the latter feature is the running shoe disclosed and claimed in my co-pending U.S. patent application Ser. No. 935,584, filed Aug. 21, 1978, which is expressly incorporated herein by reference.

A problem with the prior art footwear in general has been that the requirements of comfort, stability, support, flexibility, lightweightness and long-wearability are difficult to achieve in a single sole construction. Frequently, one of the preceding goals may be achieved in a particular sole design at the expense of another. For example, it is known that to provide long-lasting outsoles, the latter should be made of a relatively dense, durable material which, it may be appreciated, limits its flexibility and foot-cushioning ability. Although it is also known, for example, in a running shoe to provide a relatively dense, hard outsole with a softer midsole, the ability of the soft midsole to cushion the foot during foot-induced ground impact is necessarily limited by the harder outsole which is positioned between the midsole and the ground upon impact.

Women's high-heeled footwear, in particular, has a long way to go to achieve maximum comfort for the wearer. Due to the high-heeled design, women wearing such shoes typically experience rather severe stresses in their transverse metatarsal arches in the forefoot of the shoe. This is due to the weight placed upon the metatarsal arches as a result of the elevated heel and instep.

Men's footwear, albeit to a lesser degree, suffer from many of the same deficiencies.

Accordingly, it may be appreciated that the prior art footwear, especially the sole construction thereof, is severely deficient in failing to achieve all of the desired attributes mentioned above in a single sole construction. It is towards this end that the present invention is advanced.

Prior art patents which may relate to the present invention include: U.S. Pat. Nos. 2,199,853; 2,201,300; and 2,745,197; British Pat. No. 19,548 (1891); German Pat. No. 680,698 (1939); and French Pat. No. 2,269,881 (1975).

OBJECTS AND SUMMARY OF THE INVENTION

It is therefore a primary object of the present invention to provide a new and improved shoe sole construction which overcomes the disadvantages noted above with respect to prior art footwear.

Another object of the present invention is to provide a shoe sole construction with greatly improved comfort for the foot by means of improved foot cushioning.

A further object of the present invention is to provide a shoe sole construction having increased foot comfort, stability and support without sacrificing outsole wear, sole flexibility, and lightweightness.

An additional object of the present invention is to provide a shoe sole construction for a running shoe which is lightweight and flexible without sacrificing outsole wear, shock absorption, foot comfort, stability and support.

A still additional object of the present invention is to provide a novel and unique midsole-outsole construction which maximizes foot cushioning and comfort, sole flexibility, and foot support while maintaining high outsole wear capabilities in an overall lightweight construction.

Another object of the present invention is to provide a women's high-heeled shoe sole construction which alleviates much of the transverse metatarsal arch stress common with the prior art high-heeled shoe designs.

A still further object of the present invention is to provide a novel shoe sole construction which may be readily mass produced from known materials, and which may be adapted for use in a wide variety of footwear for men, women and children, either for daily use or, for example, in athletic footwear.

Another general object of the present invention is to provide an improved shoe sole construction for a running shoe which reduces the weight of my prior sole design while increasing foot comfort and cushioning as well as stability.

The foregoing and other objects are attained in accordance with one aspect of the present invention through the provision of a shoe which comprises an upper, an outsole made of a material having a first density and including at least one cutout portion formed therethrough, and a midsole made of a material having a second density which is less than the first density. The midsole is positioned between the upper and the outsole and includes a lower surface having a protruding portion that extends through the cutout portion of the outsole. In accordance with more specific aspects of the present invention, the outsole includes a bottom surface, the protruding portion extending below a portion of the bottom surface. In a running shoe embodiment, the outsole includes a plurality of lug members that extend downwardly and outwardly from the periphery of the bottom surface, the lowermost portions of some of the lug members extending below the protruding portion of the midsole and thereby adapted to contact the ground before the protruding portion contacts the ground upon foot-initiated ground impact.

In an alternate general footwear embodiment, the protruding portion is adapted to contact the ground prior to the portion of the bottom surface upon foot-initiated ground impact. More particularly, the portion of the bottom surface surrounds the protruding portion of the midsole and comprises the forefoot portion of the outsole. Even more particularly, the protruding portion is formed in the forepart of the midsole in the approximate area of the metatarsal arch of the wearer. The protruding portion preferably includes a front portion near the toe area of the shoe and a rear portion near the arch area of the shoe, the rear portion being somewhat thicker than the front portion. The outsole may further include a recessed area positioned between a portion of the bottom surface near the arch area and the rear portion of the protruding portion. In a particular embodiment, the shoe comprises a women's shoe, the outsole including a substantially high heel portion, the bottom surface of the high heel portion adapted to contact the ground while the top surface thereof includes a recess formed therein. The lower surface of the midsole may further include a second protruding portion formed in the heel area of the midsole which is adapted to mate with the recess in the top surface of the high heel portion of the outsole. The recess and the second protruding portion may be substantially longitudinally elongated extending from the heel area to the arch area of the shoe.

In accordance with other aspects of the present invention, the protruding portion may include a longitudinally formed concavity on its lower surface as well as a transversely formed concavity.

In accordance with another aspect of the present invention, the outsole may include a second cutout portion formed therethrough, while the midsole may include a second protruding portion that extends through the second cutout portion of the outsole. While the first protruding portion may be formed in the forepart of the midsole in the approximate area of the metatarsal arch, the second protruding portion is preferably formed in the rear part of the midsole in the approximate area of the heel. In one embodiment, the bottom surface of the second protruding portion of the midsole is approximately flush with the bottom surface of the outsole.

In a still alternate embodiment, the second protruding portion may be formed along the instep area of the midsole in the approximate area of the inner longitudinal arch of the wearer. In this embodiment, rather than a second cutout portion in the outsole, the outsole may have a substantially reduced width portion located approximately at the longitudinal arch area, the second protruding portion extending at the instep area below the edge of the reduced width portion of the outsole.

In accordance with yet another aspect of the present invention, the midsole may also include an upper surface, a portion of which is adapted to be compressed by the foot of a wearer upon foot-initiated ground impact, such portion of the upper surface including means for making such portion more compressible than the rest of the midsole. Such means preferably comprises cutout areas formed in the outer surface. In a particular embodiment, the cutout areas comprise a plurality of substantially parallel grooves formed substantially transversely across the upper surface of the midsole. The grooves are preferably formed on the upper surface at an angle to the centerline of the midsole, which angle substantially corresponds to the line of flexing of the metatarsal bones of the foot. The plurality of grooves are formed in a manner that define a peripheral outline that corresponds to the portion of the upper surface which is adapted to be compressed by the foot upon ground impact. The remainder of the upper surface includes substantially solid portions which comprise the outer periphery, the instep arch area, and the junction between the metatarsals and toes. Certain of the grooves may be deeper near the outside portion of the midsole than near the inside portion thereof.

In accordance with a broader aspect of the present invention, there is provided a shoe sole which comprises an outsole having a bottom portion adapted to contact the ground, and a midsole secured to the outsole and including means for contacting the ground during ground impact for cushioning the foot of the wearer. The midsole is preferably made of a less dense material than the outsole, and the outsole preferably includes an open area. The recited means preferably comprises an integral portion of the midsole which protrudes through the open area of the outsole. A plurality of such open areas and protruding integral portions of the midsole may be provided.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 1 is a side view in elevation of a running shoe which utilizes a preferred embodiment of the present invention;

FIG. 2 is a bottom view of the sole of the shoe of FIG. 1 prior to its application to the upper;

FIG. 3 is a top view of the shoe sole illustrated in FIG. 2;

FIG. 4 is a longitudinal sectional view of the shoe sole illustrated in FIG. 2 and taken along line 4—4 thereof;

FIG. 5 is a transverse sectional view of the shoe sole of FIG., 2 and taken along line 5—5 thereof;

FIG. 6 is another transverse sectional view of the shoe sole of FIG. 2 and taken along line 6—6 thereof;

FIG. 7 is a side view similar to FIG. 1 but illustrating an alternate embodiment of the present invention;

FIG. 8 is a bottom view of the shoe sole construction utilized in the embodiment illustrated in FIG. 7;

FIG. 9 is a transverse sectional view of the sole construction illustrated in FIG. 8 and taken along line 9—9 thereof;

FIG. 12 is a longitudinal cross-sectional view of the components of the alternate embodiment shown in FIG. 11 in their assembled state;

FIG. 13 is a transverse sectional view of the midsole-outsole construction of FIG. 12 and taken along line 13—13 thereof; and FIG. 14 is another transverse sectional view of the midsole-outsole of FIG. 12 which is taken along line 14—14 thereof.

DETAILED DESCRIPTION OF THE PREFERRED EMBODIMENTS

Figure 10:
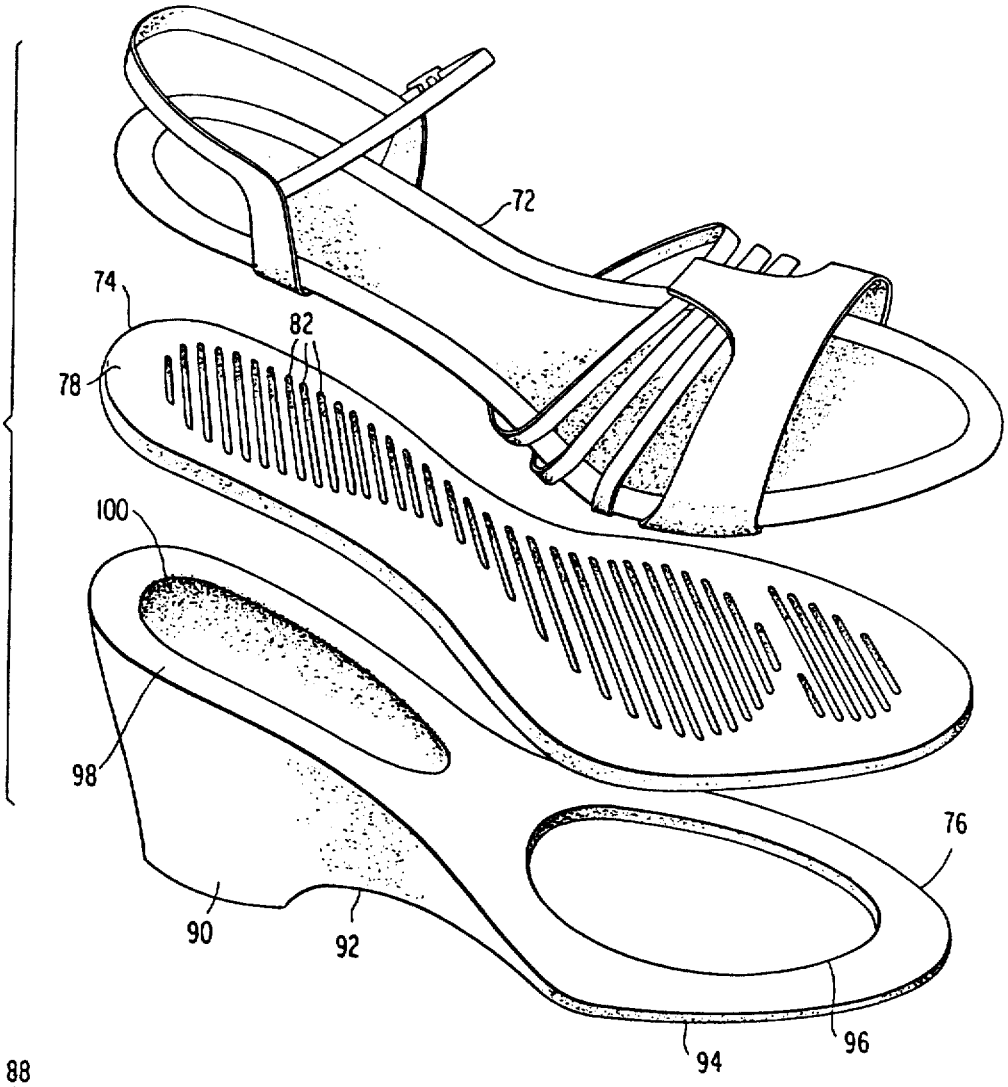
FIG. 10 is an exploded, top perspective view illustrating an alternate embodiment of the present invention as utilized in a women's high-heeled shoe.
Figure 11:
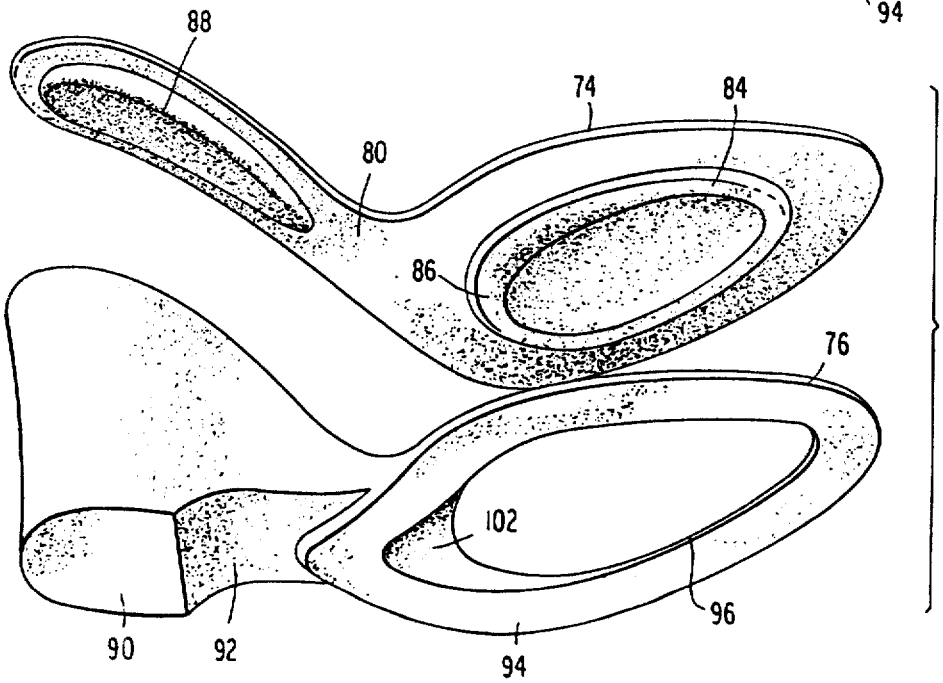
FIG. 11 is an exploded, bottom perspective view illustrating the midsole and outsole components of the women's shoe of FIG. 10.

Referring now to the drawings, wherein like reference numerals represent identical or corresponding parts throughout the several views, and more particularly to FIGS. 1–6 thereof, reference numeral 10 generally indicates a running shoe that incorporates a preferred embodiment of the present invention in the form of a novel sole construction which is indicated generally by reference numeral 12.

Shoe 10 includes an upper 14 which may be of any suitable shape, size or design. Upper 14 is lasted to a midsole 16 under which, in turn, is positioned an outsole 18. *The midsole 16 is disposed over outsole 18 and is secured to an upper surface of outsole 18.*

While outsole 18 may take any of an infinite number of different forms, as illustrated in FIGS. 1–6 outsole 18 comprises the outer sole of a running shoe which includes a plurality of downwardly and outwardly inclined lugs or levers 20 which extend from the periphery of the planar outer surface 19 of outsole 18. The illustrated embodiment of outsole 18 with lugs 20 *extending from the outer surface 19* is similar to and incorporates features of the shoe sole construction set forth in my co-pending application Ser. No. 935,584, filed Aug. 21, 1978, which application is expressly incorporated herein by reference. The shoe sole construction set forth in my co-pending application features the plurality of downwardly and outwardly inclined lugs or levers 20. As explained in my co-pending application, such a construction provides improved shock-absorption and lateral stability via the tread members 20 which provide a cantilevered support for the sole. The structure and orientation of the tread members 20 act upon ground impact to dissipate a substantial portion of the resulting shock laterally outwardly away from the central area of the sole to provide a greater degree of shock absorption and dissipation. However, since the present invention may be utilized with substantially any outsole configuration, with or without lugs or tread members, it may be appreciated that the latter construction does not form an essential component of the central concept of the present invention, as will be explained in greater detail hereinafter.

In the present invention, it is important that the midsole 16 be made of a material which is less dense than the outsole 18. Typically, the outsole 18 is formed of a more dense material to provide greater wear resistance, stability and control, while the midsole 16 is formed of a less dense, somewhat cushiony or spongy material to provide for comfort and cushioning of the foot of the wearer. By way of example, in the present invention, if the outsole 18 has a specific gravity of 1.0, the midsole 16 preferably has a specific gravity in the range of 0.3–0.4. Typical materials which may be utilized for the outsole include rubber, polyurethane, thermoplastic rubber (e.g., Kraton®, polyvinylchloride (PVC), or the like. Typical materials which may be utilized for the midsole 16 include EVA sponge, polyurethane (of a density less than that used for outsole 18), sponge rubber or the like. As may be appreciated, the more dense the material for the outsole and midsole, the less flexible will be the resultant construction. However, the more dense the outsole is, generally, the more wear-resistant it will be. A trade off must therefore be made between the selected densities of the various materials, keeping in mind the general range of relative densities discussed above.

At the toe of the outer (*lower*) surface 19 of outsole 18 is positioned a broad lug 22 to provide for increased wear. Further, as seen in FIG. 2, a rib or reinforcing strip 24 extends from the heel on the periphery of outsole 18 to a position located inwardly of the arch edge as at 13 and back out to the periphery of the outsole as at 15. The function of rib 24, especially in the instep and arch area 26, is to allow lugs 31, 33, 35, 37, 39 and 41 to flex upon ground impact to a greater degree than, for example, lugs 23, 27 and 43. This allows the instep lugs 31–41 to cup the longitudinal arch of the wearer of the shoe as they are compressed upon ground impact to a somewhat greater degree than the other lugs. Due to the fact that rib 24 intersects the lugs 31–41 at various positions thereof, a slightly different degree of compression, variable along the arch, is permitted. The maximum compression occurs at the maximum height of the arch at lug 35, and the compression reduces in both directions along the arch away from log 35. The theory here is that, since the height of the arch varies, the amount of compression is variable across the arch length, with the maximum compression of the lugs occurring where the arch is highest.

In accordance with the present invention, outsole 18 includes a cutout (*open area*) or opening 26 which is positioned (*lower*) *in the front portion of outsole 18* generally under the metatarsal arch portion of the foot of a wearer *and preferably substantially along the longitudinal axis of the sole.* While the shape of cutout 26 is illustrated as being somewhat oval, other shapes of cutouts may be employed.

An elongated, longitudinal cutout or opening 28, *preferably disposed along the longitudinal axis of the sole* may also be provided at the rear or heel portion of the outsole 18. *The shape of cutout 26 is illustrated as being somewhat oval.*

*The cutout 26 and 28 expose a portion of midsole 16. As can be seen in FIG. 2, the cutouts 26 and 28 are positioned between the peripheral lugs in the front portion and rear portion, respectively. The peripheral lugs extend below the exposed portion of the midsole.*

*A pad portion or protruding portion extends in the cutout 26 and 28. More Specifically,* [Protruding] *protruding* through the forefoot cutout 26 of outsole 18 is a *pad portion or a* front protruding portion 30 of midsole 16 that is an integral and homogeneous extension of midsole 16. Similarly, extending through the rear cutout 28 of outsole 18 is a *pad portion or a* rear protruding portion 32 of midsole 16 which is an integral and homogeneous extension of midsole 16. *The rear protruding portion 32 preferably forms a substantially continuous oval expanse.*

As may be appreciated from FIGS. 1 and 6, the front protruding portion 30 of midsole 16 forms a continuous, generally oval expanse that is positioned under the approximate area of the metatarsal arch of a wearer. Portion 30 extends somewhat below the outer planar surface 19 of outsole 18 to a position, in this embodiment, just above the lowermost tips of lugs 20, so that the *portion of outsole 18 which includes* lugs 20 *extends below the lower (bottom) surface of the protruding portion, and* will impact the ground just prior to the front protruding portion 30.

Although the front protruding portion 30 may have a variety of contours on its lower surface, as illustrated in FIGS. 2, 4 and 6, the lower surface of protruding portion 30 preferably includes a longitudinal concavity 34 as well as a transverse concavity 36.

Referring to FIG. 6, as explained in my co-pending application, upon ground impact the downwardly and outwardly inclined lug members 27 and 29 are laterally outwardly displaced which permits greater vertical movement of the shoe upon ground impact. This vertical movement of the shoe results in a certain amount of impact shock being stored in the resilient lug members 27 and 29 which is then released during the flow of ground contact thereby springing the runner forward which may be thought of as the release of stored kinetic energy. The present invention, in providing a cutout portion 26 of the outsole 18 through which a protruding portion 30 of the midsole extends, provides two important functions. Initially, the cutout portion of the outsole 18 provides a more lightweight construction, since some of the more dense and hence heavier outsole is dispensed with. Secondly, the protruding portion 30 of the less dense midsole 16 provides an extremely soft cushioning material under the metatarsal arch. Upon ground deformation, due partially to the somewhat concavities of the protruding portion 30, the latter deflects upwardly, compressing and in essence forming to and thereby supporting the metatarsal arch of the wearer which is positioned above the protruding portion 30. The reason for the lower extension of portion 30 is to insure upward compression upon ground contact so that the portion of the midsole 16 above portion 30 will fill the voids of the metatarsal arch to a much greater degree than heretofore possible due to the prior art's solid outsole construction and therefore limited flexibility. Thus, a cushioning and comforting effect is achieved with the protruding midsole of the present invention to a far greater degree than heretofore possible.

Referring now to FIG. 5, note that in the rear portion of the foot, the lowermost portion of the protruding portion 32 is preferably flush with the lower surface 19 of outsole 18 and will therefore not impact with the ground to the extent that the front protrusion 30 will. However, in compression of the lugs 23 and 25 in the heel portion, the center area of the midsole 16 will remain uncompressed which will allow the heel (which is rounded on the bottom) to maintain as round a position as possible. In other words, there are no voids to fill in the heel area as there are in the metatarsal arch area. A further benefit of the cutout 28 in the rear portion of the outsole 18 is a weight reduction due to a decrease in the more dense outsole material. There is further a slight amount of increased cushioning effect between the heel and the bottom of the shoe due to the protruding portion 32. *As shown in FIG. 5, the lowermost (bottom) portion of the lug members extend below the lower surface of protruding portion 32.* However, it should be understood that the present invention is not limited to the provision of both protruding portions 30 and 32, and it may be appreciated that the benefits of one or the other, or both, may be desirable in any given shoe design. It should also be understood that the midsole protrusion through the outsole may be utilized with any outsole configuration, not merely with a running shoe configuration, as will become more clear hereinafter.

As may be seen in FIG. 3, the midsole 16 includes an inclined outer wall 38 which extends about substantially the entire periphery of midsole 16. As seen in FIG. 4, the thickness of midsole 16 tapers down from the heel to the toe thereof, as is conventional with running shoes. Indicated in FIGS. 3 and 4 by reference numeral 40 is the upper, substantially planar surface of midsole 16. Formed in planar surface 40 are a plurality of cutouts or grooves 42 which are preferably arranged in a predetermined pattern on surface 40. More particularly, grooves 42 are preferably oriented along the lines of the actual flexing of the metatarsal bones and flanges on the toes of a wearer. Grooves 42 form an angle of approximately 50 degrees measured from the longitudinal centerline of the midsole 16, or 40 degrees from the transverse centerline.

As may be appreciated from FIG. 3, the grooves 42 are of a variable width along the surface 40. The grooves 42 therefore define a heel portion 44, a narrow arch portion 46, a relatively wide metatarsal portion 48, a narrow metatarsal-toe interface portion 50, and a toe portion 52. The contour of portions 44 through 52, it may be appreciated, corresponds to the weight-bearing area of the foot in order to make that portion of the midsole 16 containing grooves 42 more compressible (less dense) where the foot strikes it. In this manner, the lower surface of the foot contours to the upper surface of midsole 16 more readily to provide better support and more comfort for the wearer. By virtue of the reduced density portion of the upper surface 40 of midsole 16 provided by grooves 42, the foot cradles into the upper surface 40 more readily which aids materially in cushioning of the foot. As mentioned above, grooves 42 further aid in providing additional flexibility to the forepart of the foot roughly on the line of the actual flexing of the metatarsal bones and flanges on the toes.

It should be noted that the variable width of the grooves 42 also define solid portions of the upper surface 40, such as the peripheral portion 54, the instep arch portion 56, and the metatarsal-toe interface 58. The solid external periphery 54 provides a continuous unbroken support for the foot bed to provide greater stability for the foot to minimize problems such as pronation. The same holds true for the arch portion 56 and the metatarsal-toe interface portion 58. These are the areas where support, rather than soft compression, are required during foot-induced ground impact. In other words, the solid portions 54, 56 and 58 of the upper surface 40 of midsole 16 define those areas where the lower surface of a wearer's foot would not normally impact.

The particular depth of grooves 42 will depend upon the desired density and compression of that portion of the upper surface 40 over which lies the foot. It may, however, be desirable to provide a very slight inclination see (FIG. 5) whereby the portion 60 of groove 42 on the outside of the sole is somewhat deeper than the portion 62 on the inside of the sole. That is, grooves 42 may be made somewhat deeper on the lateral side of the foot than the medial side of the foot in order to provide, to a slight extent, better control of pronation by providing more cushioning (less density) on the outside of the groove than on the inside. The angle of inclination of groove 42 from the outside 60 to the inside 62 may be, for example, about 3 degrees, but such angle could change along the longitudinal length of the midsole.

Referring to FIGS. 7–9, there is illustrated an alternate embodiment of the present invention, still with reference however to a running shoe. *As illustrated, both the rear cutout portion 28 and the protruding portion 32 are tapered in width towards the middle portion of the shoe.* In FIGS. 7–9, reference numeral 64 indicates the outsole having a planar outer surface 66. The instep portion of outsole 64 in this embodiment, however, terminates inwardly of the instep thereby defining a reduced width portion located approximately at the longitudinal arch area. In this embodiment, an additional protrusion 68 of the midsole 16 is provided which extends below the instep arch of the wearer down past the outer edge of the instep periphery of the outsole 64. The longitudinal arch protrusion 68 of midsole 16 performs a function similar to the metatarsal arch protrusion 30. That is, upon ground impact, protrusion 68 will be distorted upwardly so as to cushion the instep arch of the wearer. In this embodiment, the web portion 26 of outsole 64 along the arch instep defines the outer periphery of outsole 64 in the arch area, and the lug members 51, 53, 55, 57, 59, 61, 63, 65 and 67 are all located inside the web 24.

It should again be noted that the longitudinal arch protrusion 68 may be utilized either alone or in combination with either the transverse arch protrusion 30 and/or the heel protrusion 32. Further, use of any of the protrusions 30, 32 and 68 is not limited to a running shoe, as will be illustrated below.

In manufacturing the midsole-outsole construction of the present invention, a double pour mold or double density injection process may be utilized. The outsole can be molded and then the insole may be immediately molded on top of the outsole to provide a molecular bond between the two pieces of differing densities. Alternately, the outsole and the midsole may be fabricated separately and then glued or otherwise secured together.

Referring now to FIGS. 10 through 14, an alternate embodiment of the present invention is illustrated wherein the midsole-outsole construction is applied to a woman's high-heeled shoe which is indicated generally in FIG. 10 by reference numeral 70. The shoe 70 includes an upper 72 (which may take any form), a midsole 74 having the same properties and specifications as midsole 16 of the first embodiment, and a high heeled outsole 76 which may have the same properties and specifications as the outsole 18 of the first embodiment.

The less dense midsole 74 includes an upper surface 78 and a lower surface 80. Transverse grooves 82 may be formed on the upper surface 78, if desired, which are similar in shape and function to the grooves 42 of the first embodiment. Protruding from the lower surface 80 is a front protruding portion 84 that underlies the metatarsal arch area and which preferably includes a longitudinal and transverse concavity as with the first embodiment. The rear portion 86 of the front protrusion 84 is preferably of an increased thickness due to the initiation of the upward curve of the midsole 74 at the front portion of the arch area.

Also protruding from the lower surface 80 is a heel protrusion 88 which is somewhat wedge-shaped and extends downwardly from the heel to the beginning of the arch area.

The outsole 76 includes a raised heel structure 90, an arch area 92, and a frontal portion 94. Portions 90 and 94 generally are adapted to contact the ground and may be stippled or provided with a similar non-skid surface thereon.

Formed within the frontal portion 94 is a cutout opening 96 for receiving the protrusion 84 therethrough.

Formed on the upper surface 98 of the outsole 76 near the heel is a longitudinal indentation or recess 100 for receiving the heel protrusion 88. Note that, in this embodiment, the heel protrusion 88 does not extend through the entire heel structure 90, but simply forms an increased thickness midsole portion under the heel for improved cushioning and comfort.

In the frontal portion 94 of outsole 76, just rearwardly of the increased thickness 86 of protrusion 84, is a recessed area 102 to provide room for the portion 86 to compress into upon foot-initiated ground impact. However, the major thrust of such impact will be to compress the portion 84 upwardly into the transverse metatarsal arch of the wearer to provide substantial cushioning and improved comfort.

Since, in a woman's high-heeled shoe, the weight of the foot is generally concentrated forwardly into the metatarsal bed, the provision of the front protrusion 84 is significant. In this embodiment, note also from FIG. 12 that the protrusion 84 impacts the ground prior to the rest of the front portion 94 of the outsole 76. This is due to the relatively rigid portion 94 which does not contain lug members as exist in the running shoe embodiment discussed above. The benefits of the grooves 82 in the upper surface 78 of midsole 74 are the same as described above in connection with the first embodiment. The heel protrusion 88 provides additional cushioning under the heel while maintaining the heel as round as possible.

Obviously, numerous modifications and variations of the present invention are possible in light of the above teachings. For example, the same concepts may be applied to men's or children's general footwear, as well as other styles of women's footwear. Clearly, therefore, within the scope of the appended claims, the invention may be practiced otherwise than as specifically described herein.

I claim as my invention:

1. A shoe, which comprises:

an upper;

an outsole made of a material having a first density and including at least one generally oval cutout portion formed therethrough under the metatarsal arch portion of the foot of a wearer; [and]

*means for cushioning the foot of a wearer, said cushioning means comprising* a midsole made of a material having a second density less than said first density and positioned between said upper and said outsole, said midsole including a lower surface having a protruding portion that extends through said cutout portion of said outsole, said protruding portion forming a continuous, generally oval expanse that is positioned in the forepart of said midsole under the approximate area of the metatarsal arch of a wearer[. ] ;

*wherein a portion of a lower surface of said outsole extends below said lower surface of said protruding portion.*

2. A shoe as set forth in claim 1, wherein said outsole includes a bottom surface and wherein said protruding portion extends below a portion of said bottom surface.

3. A shoe as set forth in claim 1, wherein said protruding portion includes a longitudinally formed concavity on its lower surface.

4. A shoe as set forth in claims 1 or 3, wherein said protruding portion includes a transversely formed concavity on its lower surface.

5. A shoe as set forth in claim 2, wherein said protruding portion is adapted to contact the ground prior to said portion of said bottom surface upon foot-initiated ground impact.

6. A shoe as set forth in claim 5, wherein said portion of said bottom surface surrounds said protruding portion of said midsole and comprises the forefoot portion of said outsole.

7. A shoe as set forth in claim 1, wherein said outsole further includes a second cutout portion formed therethrough and said midsole further includes a second protruding portion that extends through said second cutout portion of said outsole.

8. A shoe as set forth in claim 7, wherein the first protruding portion is formed in the forepart of said midsole in the approximate area of the metatarsal arch, while said second protruding portion is formed in the rear part of said midsole in the approximate area of the heel.

9. A shoe as set forth in claim 8, wherein the bottom surface of said second protruding portion of said midsole is approximately flush with the bottom surface of said outsole.

10. A shoe as set forth in claim 7, wherein the first protruding portion is formed in the forepart of said midsole in the approximate area of the metatarsal arch, while said second protruding portion is formed along the instep area of said midsole in the approximate area of the inner longitudinal arch.

11. A shoe as set forth in claim 1, wherein said midsole further includes an upper surface a portion of which is adapted to be compressed by the foot of a wearer upon foot-initiated ground impact, said portion of said upper surface including means for making said portion more compressible than the rest of said midsole.

12. A shoe as set forth in claim 11, wherein said means comprises cut out areas formed in said upper surface.

13. A shoe as set forth in claim 12, wherein said cut out areas comprise a plurality of substantially parallel grooves formed substantially transversely across said portion of said upper surface.

14. A shoe as set forth in claim 13, wherein said grooves are substantially parallel to the lines of flexing of the metatarsal bones of the foot.

15. A shoe as set forth in claim 13, wherein said grooves are formed on said portion of said upper surface at an angle to the centerline of said midsole which angle substantially corresponds to the lines of flexing of the metatarsal bones of the foot.

[16. A shoe sole, which comprises:

an outsole having a bottom portion adapted to contact the ground and an open area formed in the forepart of the outsole generally under the metatarsal arch; and a midsole secured to said outsole and including a protruding portion extending through said open area of said outsole for contacting the ground during ground impact for cushioning the foot of the wearer, said protruding portion forming a continuous, generally oval expanse that is positioned in the forepart of said midsole under the approximate area of the metatarsal arch of a wearer.]

[17. A shoe as set forth in claim 16, wherein said midsole is made of a less dense material than said outsole.]

[18. A shoe sole as set forth in claim 16, wherein said outsole includes a plurality of open areas and further comprising a plurality of integral portions of said midsole which respectively protrude through said plurality of open areas.]

19. A shoe, which comprises:

an upper;

an outsole having a bottom portion adapted to contact the ground and an open area formed in the forepart of the outsole generally under the metatarsal arch; and a midsole *comprised of a cushioning material for cushioning the foot of a wearer upon ground impact, said midsole* secured to said outsole and said upper, said midsole including a protruding portion extending through said open area of said outsole for contacting the ground during ground impact for cushioning the foot of the wearer, said protruding portion forming a continuous, generally oval expanse that is positioned in the forepart of said midsole under the approximate area of the metatarsal arch of a wearer[.] ;

*wherein a portion of a lower surface of said outsole extends below the lower surface of said protruding portion.*

20. A shoe as set forth in claim 19, wherein said midsole is made of a less dense material than said outsole.

21. A shoe as set forth in claim 19, wherein said outsole includes a plurality of open areas and further comprising a plurality of integral portions of said midsole which respectively protrude through said plurality of open areas.

[22. A midsole, which comprises:

an upper surface a portion of which is adapted to be compressed by the foot of a wearer upon foot-initiated ground impact, said portion of said upper surface including cut out groove means for making said portion more compressible than the rest of said midsole; and a lower surface including a continuous, generally oval protrusion extending under the metatarsal arch of a wearer for contacting the ground during foot-induced impact for cushioning the metatarsal arch of the wearer.]

[23. A midsole as set forth in claim 22, wherein said cut out groove means comprise a plurality of substantially parallel grooves formed substantially transversely across said portion of said upper surface.]

[24. A midsole as set forth in claim 23, wherein said grooves are substantially parallel to the lines of flexing of the metatarsal bones of the foot.]

[25. A midsole as set forth in claim 23, wherein said grooves are formed on said portion of said upper surface at an angle to the centerline of said midsole which angle substantially corresponds to the lines of flexing of the metatarsal bones of the foot.]

[26. A shoe, which comprises:

an upper;

an outsole; and a midsole positioned between said upper and said outsole;

said midsole including an upper surface a portion of which is adapted to be compressed by the foot of a wearer upon foot-initiated ground impact, said portion of said upper surface including cut out groove means for making said portion more compressible than the rest of said midsole; and a lower surface including a continuous, generally oval protrusion extending under the metatarsal arch of a wearer for contacting the ground during foot-induced impact for cushioning the metatarsal arch of the wearer.]

[27. A shoe as set forth in claim 26, wherein said cut out groove means comprise a plurality of substantially parallel grooves formed substantially transversely across said portion of said upper surface.]

[28. A shoe as set forth in claim 27, wherein said grooves are substantially parallel to the lines of flexing of the metatarsal bones of the foot.]

[29. A shoe as set forth in claim 27, wherein said grooves are formed on said portion of said upper surface at an angle to the centerline of said midsole which angle substantially corresponds to the lines of flexing of the metatarsal bones of the foot.]

*30. A shoe as recited in claim 19, further comprising a plurality of lugs extending from a peripheral portion of said outsole.*

*31. A shoe as recited in claim 19, wherein said bottom portion of said outsole extends below a lower surface of said protruding portion.*

*32. A shoe as recited in claim 30, wherein said protruding portion forms a continuous, generally oval expanse.*

*33. A shoe as recited in claim 1, further comprising a plurality of lugs extending from a peripheral portion of said outsole.*

*34. A shoe sole which comprises:*

*an outsole having rear and middle portions, an upper surface, a plurality of peripheral lugs and a cutout portion, said cutout portion positioned between said peripheral lugs;*

*a midsole secured to said upper surface of said outsole, said midsole including a bottom surface having a protruding portion in said cutout portion of said outsole;*

*wherein the lowermost portion of said lug members extend below the lower surface of said protruding portion.*

*35. A shoe sole as recited in claim 34, wherein said cutout portion is substantially oval.*

*36. A shoe sole as recited in claim 35, wherein said protruding portion is tapered in width towards said middle portion.*

*37. A shoe sole as recited in claim 36, wherein said bottom surface of said protruding portion is flush with said lower surface of said outsole.*

*38. A shoe sole as recited in claim 35, wherein said protruding portion is substantially oval.*

*39. A shoe sole as recited in claim 38, wherein said bottom surface of said protruding portion is flush which said lower surface of said outsole.*

*40. A shoe sole as recited in claim 34, wherein said cutout portion is tapered in width towards said middle portion.*

*41. An athletic shoe which comprises:*

*an upper;*

*an outsole having rear and middle portions, a peripheral portion, upper and lower surfaces, and a longitudinal cutout portion, said cutout portion disposed inwardly from said peripheral portion in said rear portion of said athletic shoe; and*

*means for cushioning the foot of a wearer, said means comprising a midsole secured to said upper surface of said outsole, said midsole including a bottom surface having a protruding portion in said cutout portion of said outsole of said athletic shoe;*

*wherein a portion of said lower surface of said outsole extends below a bottom surface of said protruding portion.*

*42. A shoe sole as recited in claim 41, wherein the density of said outsole is greater than the density of said midsole.*

*43. A shoe sole as recited in claim 41 wherein said cutout portion and said protruding portion taper in width towards said middle portion.*

*44. An athletic shoe as recited in claim 41, wherein said cutout portion and said protruding portion extend from said rear portion to said middle portion.*

*45. An athletic shoe as recited in claim 44, wherein said cutout portion extends substantially along the longitudinal axis of said outsole.*

*46. A shoe which comprises:*

*an upper;*

*an outsole made of a material having a first density and including at least one cutout portion formed therethrough; and*

*a midsole made of a material having a second density less than said first density and positioned between said upper and said outsole, said midsole including a lower surface having a protruding portion in said cutout portion of said outsole; wherein said outsole includes a plurality of lug members that extend from the periphery of said bottom surface, the lowermost portions of certain of said lug members extending below said protruding portion and thereby adapted to contact the ground before said protruding portion contacts the ground upon foot-initiated ground impact.*

*47. A shoe as set forth in claim 46, wherein said midsole material is EVA.*

*48. A shoe, which comprises:*

*an upper;*

*an outsole made of a material having a first density and a cutout portion formed therethrough;*

*a midsole made of a material having a second density less than said first density and positioned between said upper and said outsole, said midsole including a lower surface having a protruding portion that extends in said cutout portion of said outsole; said protruding portion being formed along the instep area of said midsole in the approximate area of the inner longitudinal arch.*

*49. A shoe sole as recited in claim 48, wherein said outsole further comprises a plurality of lugs disposed along the periphery of said outsole.*

*50. A shoe as set forth in claim 48, wherein said midsole material is EVA.*

*51. A shoe sole as recited in claim 48, wherein said cutout portion in said outsole extends from said heel portion to said arch portion.*

*52. A shoe sole as recited in claim 51, further comprising a plurality of lugs disposed along the periphery of said outsole.*

*53. A shoe sole which comprises:*

*an outsole having rear and front portions, an upper surface, a lower surface, a plurality of peripheral lugs and a cutout portion, said cutout portion disposed substantially along the longitudinal axis of said outsole;*

*a midsole having a lower surface, said midsole disposed above said outsole;*

*cushioning means located on said lower surface of said midsole, said cushioning means including a pad portion exposed by said cutout portion of said outsole;*

*wherein the bottom surface of said peripheral lugs extends below the bottom surface of said pad portion.*

*54. A shoe sole as recited in claim 53, wherein said pad portion is integral with said midsole.*

*55. A shoe sole as recited in claim 53, wherein the density of said outsole is greater than the density of said pad portion.*

*56. A shoe sole as recited in claim 53, wherein said cutout portion and said pad portion are disposed in said rear portion of said outsole.*

*57. A shoe sole as recited in claim 56, wherein said lower surface of said outsole extends below said bottom surface of said pad portion.*

*58. A shoe sole as recited in claim 53, wherein said cutout portion and said pad portion are disposed in said front portion of said outsole.*

*59. A shoe sole which comprises:*

*an outsole having rear, middle and front portions, a peripheral portion, upper and lower surfaces, a cutout portion, and a plurality of lugs extending from said peripheral portion of said lower surface of said outsole; said cutout portion positioned between said lugs;*

*a midsole secured to said upper surface of said outsole, said cutout portion of said outsole exposing a portion of said midsole;*

*said lugs extending below said exposed portion of said midsole.*

*60. A shoe sole as set forth in claim 59, wherein said cutout portion is disposed in said rear portion of said outsole.*

*61. A shoe sole as set forth in claim 59, wherein said cutout portion is disposed in said front portion of said outsole.*

*62. A shoe sole as recited in claim 59, wherein said outsole has a density greater than the density of said midsole.*

*63. A shoe sole as recited in claim 59, wherein said exposed portion of said midsole extends in said cutout portion.*

* * * * *

UNITED STATES PATENT AND TRADEMARK OFFICE

CERTIFICATE OF CORRECTION

PATENT NO. : Re. 33,066

DATED : September 26, 1989

INVENTOR(S) : Jerry D. Stubblefield

It is certified that error appears in the above-identified patent and that said Letters Patent is hereby corrected as shown below:

On the face of the Official Letters Patent, under the heading Related U.S. Patent Documents, after "Patent No.:", delete "4,817,278", and insert --4,481,727-- therefor;

Column 5, line 52, after "®", insert --)--;

Column 6, line 14, delete "log", and insert --lug-- therefor;

line 21, delete "(lower)";

Column 10, line 38, bracket "through", also before "said" insert --*in*--;

Column 11, line 68, bracket "through", also before "said" insert --*in*--;

Column 12, line 3, before "forming" insert --[--;

line 4, after "is" insert --]--; and

Column 13, line 36, delete "*which*" and insert --*with*-- therefor.

Signed and Sealed this

Twentieth Day of November, 1990

*Attest:*

*Attesting Officer*

HARRY F. MANBECK, JR.

*Commissioner of Patents and Trademarks*